Feb. 6, 1968 P. D. WASSERMAN 3,368,149
DIGITAL VOLTMETER HAVING A CAPACITOR CHARGED BY AN
UNKNOWN VOLTAGE AND DISCHARGED BY A KNOWN VOLTAGE
Filed June 4, 1965 4 Sheets-Sheet 1

Fig_1

Fig_2

Fig_9

INVENTOR
PHILIP D. WASSERMAN
BY
ATTORNEY

INVENTOR
PHILIP D. WASSERMAN
BY
ATTORNEY

United States Patent Office 3,368,149
Patented Feb. 6, 1968

3,368,149
DIGITAL VOLTMETER HAVING A CAPACITOR
CHARGED BY AN UNKNOWN VOLTAGE AND
DISCHARGED BY A KNOWN VOLTAGE
Philip D. Wasserman, Atherton, Calif., assignor to Data Technology Corporation, Mountain View, Calif., a corporation of California
Filed June 4, 1965, Ser. No. 461,434
9 Claims. (Cl. 324—99)

ABSTRACT OF THE DISCLOSURE

An analog to digital converter employs an integrating circuit which integrates the unknown potential for a fixed period of time. The integrator output is supplied to an amplifier having outputs of opposite polarity, and one of these outputs is used to control a reference potential which is supplied to the integrator circuit. The length of time required for the reference potential to bring the integrator circuit output to a predetermined value is a measure of the magnitude of the unknown voltage.

---

This invention relates to voltmeters and more particularly to an analog-to-digital converter or digital voltmeter.

It has been proposed that a digital voltmeter can be constructed by applying an unknown potential to an integrating circuit for a predetermined first time interval and then applying an opposite polarity reference potential to the integrator until the output of the integrator reaches zero. This second time interval can be shown to be proportional to the magnitude of the unknown potential and a measure of this time interval is a measurement of the unknown potential. In order to obtain a high degree of accuracy with such a voltmeter, the first time interval must be closely controlled and the second time period must be accurately determined. Also, the length of the time period must be recorded or otherwise made visible to produce an indication of the magnitude of the unknown potential. Further, since the polarity of the unknown potential may change, means must be provided for automatically changing the polarity of the reference potential. Additional features required are an adjustable scale or range and the prevention of erroneous readings when the polarity of the unknown potential changes. Also desirable is an indication of the unknown potential exceeding a predetermined maximum magnitude or not exceeding a predetermined minimum value.

Accordingly, an object of this invention is to provide an improved digital voltmeter.

Still another object of this invention is to provide an improved digital voltmeter that includes an analog portion operably coupled to a digital portion to provide a precise first time interval and to accurately determine an unknown second time interval.

A further object of this invention is to provide a digital voltmeter that is not affected by zero average noise.

Still another object of this invention is to provide a digital voltmeter that indicates when the potential being measured is within preset limits.

Another object of this invention is to provide a digital voltmeter that prevents erroneous output readings when the polarity of the unknown potential being measured changes.

These and other objects of the present invention are obtained by a digital voltmeter that includes an integrating circuit. An unknown input potential is applied to the integrator for a predetermined time interval and an amplifier having two opposite polarity outputs has its input coupled to the output of the integrator circuit. Means responsive to the two outputs of the amplifier apply a reference potential of opposite polarity to the integrator circuit for a time interval that is proportional the magnitude of the unknown potential and means for measuring this time interval are provided.

In accordance with another feature of the present invention, a counter is adapted to receive a plurality of sequentially occurring pulses produced by an oscillator and display means are provided for visually indicating the number in the counter. Coincidence detecting means produce a signal indicative of the lapse of a precise time interval during which the unknown potential was applied to said integrator circuit in response to a predetermined number occurring in said counter. Means responsive to the coincidence detecting means signal enable a preselected number to be placed in the counter and gating means responsive to the output of the integrating circuit produce a signal that indicates the number in the counter as being proportional to the unknown potential to enable this number to be transferred to display means.

In accordance with another feature of this invention a delay means is provided so that a reading takes place only after the output of the integrator has had enough time to arrive at a significant level with the lowest value of unknown input of interest so as to prevent erroneous readings when the polarity of the unknown potential changes.

In accordance with still another feature of this invention low and high limit sources are provided which, in cooperation with gating means, provides an indication whenever the unknown potential exceeds, falls below, or falls within a preset range.

This invention as well as other objects, features and advantages thereof will be readily apparent from consideration of the following detailed description relating to the accompanying drawings in which like reference characters designate like or corresponding parts throughout the several views and wherein:

Generally, the digital voltmeter comprising this invention comprises two sections or parts. The first section includes an analog circuit which provides a voltage pulse the width of which is accurately proportional to the average value of an unknown input voltage and the second section includes digital circuitry for converting this pulse width into a corresponding decimal number. The analog and digital sections are operably combined to form a voltage-to-digital converter or digital voltmeter.

Figure 1:
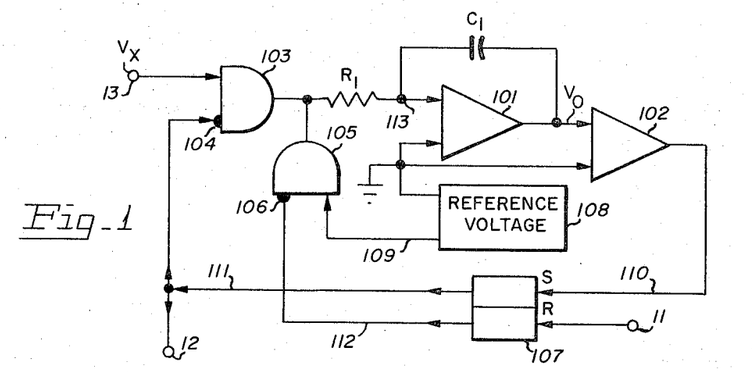
FIGURE 1 illustrates a logic diagram of a digital voltmeter utilizing an integrator circuit.

The generation of a voltage pulse having a width accurately proportional to an unknown voltage can readily be understood by considering FIGURE 1 wherein there is illustrated an integrating circuit including the amplifier 101, resistor $R_1$ and capacitor $C_1$. The voltage output $V_0$ of the integrating circuit is applied to a "Zero Crossing Amplifier" 102 and the input of the integrating circuit is coupled to the output of an analog gate 103. The analog gate 103 is a precision analog gate which will either transmit an unknown input voltage $V_x$ to the input of the integrating circuit with substantially no attenuation when a positive voltage level is present on the gate enabling terminal 104, or present a virtual open circuit to the input voltage $V_x$ when a negative or zero voltage level is present on the gate enabling terminal 104. As is well known to those skilled in the art, such analog gates are readily fabricated from either transistors, diodes, vacuum tubes, etc., and can be designed to be enabled by negative or positive voltage levels. The enabling terminal 104 of the analog gate is coupled to the set S output side of a binary device, such as a flip-flop 107.

The input of the integrating circuit is also coupled to another analog gate 105, substantially identical to the analog gate 103, which has its enabling terminal 106 coupled to the reset output side of the flip-flop 107 and its input coupled to a source of reference voltage 108. The flip-flop 107 has its set S input coupled to the output of the "Zero Crossing Amplifier" 102 and its reset R input coupled to a terminal 11. The output of the set side of the flip-flop 107 is also coupled to a terminal 12.

The operation of the device illustrated in FIGURE 1 can be understood by assuming that the output voltage $V_0$ of the integrating amplifier 102 is zero and that the flip-flop 107 is in its set condition thereby producing a positive level voltage on the line 111 and a zero or negative level voltage on the lead 112. These voltage levels cause the analog gate 103 to be enabled and the analog gate 105 to be disabled thereby causing the unknown input voltage $V_x$ to be applied to the integrating amplifier 101. If the unknown input voltage $V_x$ is negative, the output $V_0$ of the integrating amplifier will increase in a positive direction thereby causing the output of the "Zero Crossing" amplifier 102 to increase negatively. If, after a precise time interval $T_1$, a positive read-out pulse is applied to the terminal 11, causing the flip-flop 107 to be placed into its reset condition, then a positive voltage level will appear on the lead 112 and a negative voltage level will appear on the lead 111. These voltage levels cause the analog gate 103 to be disabled thereby removing the unknown input voltage $V_x$ as the input to the integrating amplifier and enable the analog gate 105 thereby causing a DC reference voltage 108 to be applied to the input of the integrating amplifier 101. The reference voltage 108 has a polarity opposite to that of the unknown input voltage $V_x$ and is therefore positive. This positive reference voltage causes the output voltage $V_0$ of the integrating amplifier to decrease in a negative direction which in turn causes the output of the "Zero Crossing" amplifier to decrease in a positive direction.

When the output $V_0$ of the integrating amplifier has decreased to just beyond zero volts thereby becoming slightly negative, the output of the "Zero Crossing" amplifier 102 becomes slightly positive which causes the flip-flop 107 to be switched from its reset to its set condition. Setting of the flip-flop 107 causes a zero or negative potential to appear on the reset output of the flip-flop 107 which potential is applied, by way of lead 112, to the enabling input 106 of the analog gate 105 disabling the gate 105 thereby removing the reference potential 108 from the input to the integrating amplifier 101 because the gate 105 now acts as an open circuit to the reference voltage 108. At the same time, as the potential at the reset output of the flip-flop 107 goes zero or negative, the potential at the set output goes positive and is applied to the terminal 12 and to the enabling terminal 104 of the analog gate 103 thereby enabling the gate 103 which causes the unknown input voltage $V_x$ again to be applied to the input of the integrating amplifier 101.

The appearance of the positive potential on the terminal 12, due to the flip-flop 107 being set, is utilized to initiate the beginning of the predetermined time interval $T_1$ during which the unknown voltage $V_x$ is applied to the integrating amplifier 101. At the end of this precise time interval a read-out pulse is applied to the terminal 11 which resets the flip-flop 107 causing $V_x$ to be removed as the input of the integrating amplifier and causing the reference voltage 108 to be applied to the integrating amplifier 101 until the output of the "Zero Crossing" amplifier becomes sufficiently positive to switch the flip-flop 107 back to its set state. This cycle will be repeated indefinitely as long as positive read-out pulses are applied to the terminal 11 at the end of each time period $T_1$.

The time interval during which the reference voltage 108 is applied as the input to the integrating amplifier 101, that is, the time period beginning when the flip-flop 107 is reset by a read-out pulse on terminal 11 and ending when the flip-flop is set by the output of the "Zero Crossing" amplifier going slightly positive, is identified as the time interval $T_2$. Since the reference voltage 108 is a DC level signal, the output $V_0$ of the integrating amplifier during time $T_2$ is a slanted voltage line having a constant slope. The time required to cause $V_0$ to reach and cross zero volts, causing the output of the "Zero Crossing" amplifier to become positive thereby switching the flip-flop 107 into its set condition and terminating the $T_2$ time interval, is dependent upon the magnitude of $V_0$ (the output of the integrating amplifier) at the termination of the time interval $T_1$ which in turn is dependent upon the magnitude of the unknown input voltage $V_x$. That is, the time interval $T_2$, or the time required for the output $V_0$ of the integrating amplifier 101 during the time interval $T_2$ to become sufficiently negative so as to cause the amplifier 102 to "set," is directly proportional to the magnitude of the unknown input voltage $V_x$.

For example, if the gain of the integrating amplifier 101 is sufficiently high, the summing junction 113 is virtually at ground potential and a current $$i_x = \frac{V_x}{R_1}$$

will flow into the junction 113 during time interval $T_1$. During this time interval $T_1$ the output $V_0$ of the integrating amplifier increases as defined by the equation:

$$V_0 = \frac{1}{C_1} \int_0^T i_x dt \qquad (1)$$

which assumes that the current drawn by the integrating amplifier is negligible and that the gain of the integrating amplifier is very high. Accordingly, after the time interval $T_1$ has elapsed;

$$\Delta V_{01} = \frac{1}{C_1} \int_0^{T_1} i_x dt \qquad (2)$$

However, since $$i_x = \frac{V_x}{R_1}; \quad V_{01} = \frac{1}{R_1 C_1} \int_0^{T_1} V_x dt \qquad (3)$$

where $T_1$ is the time interval during which the unknown input voltage $V_x$ is applied to the input of the integrating amplifier, that is, the time interval beginning when the flip-flop 107 of FIGURE 1 is switched into its set S state by the output of the "Zero Crossing" amplifier 102 and ending when a read-out pulse applied to the terminal 11 switches the flip-flop 107 into its reset R condition.

During the time interval $T_2$, the reference voltage 108, having a polarity opposite to the unknown input $V_x$, is applied to the input of the integrating amplifier 101. The time interval $T_2$ is terminated by the output of the integrating amplifier reaching zero volts and hence an expression for $\Delta V_0$ during time $T_2$ may be written as:

$$\Delta V_0 = \frac{1}{C_1}\int_0^T i_{ref}dt \text{ where } i_{ref} = \frac{V_{ref}}{R_1} \quad (4)$$

and $V_{ref}$ is the reference voltage 108. Therefore:

$$\Delta V_0 = \frac{1}{R_1 C_1}\int_0^T V_{ref}dt \quad (5)$$

However, since the reference voltage 108 is a steady DC potential, Equation 5 may be written as:

$$\Delta V_0 = \frac{V_{ref}T_2}{R_1 C_1} \quad (6)$$

Since $V_0$ starts the time period $T_1$, at zero and ends at the termination of the time period $T_2$ at zero, Equations 2 and 6 may be combined as follows:

$$\frac{V_{ref}T_2}{R_1 C_1} = \frac{1}{R_1 C_1}\int_0^{T_1} V_x dt \quad (7)$$

By rearranging and cancelling, the following expression for $T_2$ can be obtained $$T_2 \int_0^{T_1} \frac{V_x dt}{V_{ref}} \quad (8)$$

If $V_x$ is constant over the time interval $T_1$ Equation 8 becomes:

$$T_2 = \frac{V_x T_1}{V_{ref}} \quad (9)$$

Equation 9 shows that the time interval $T_2$, or the duration of the positive output of the integrating amplifier during the time period $T_2$, is independent of the value of the resistor $R_1$ and the capacitor $C_1$ and directly proportional to the unknown input voltage $V_x$ and the time interval $T_1$. This time interval $T_1$ can be accurately determined by any suitable means, such as an electronic counter as described in detail hereinbelow. Equation nine also shows that $T_2$ is inversely proportional to the reference voltage 108 which may be as accurate and stable as the art permits. It is clear then that by measuring the time interval $T_2$, a reading is obtained that is proportional to the unknown input voltage $V_x$. As will be obvious to those skilled in the art, this reading or determination of the time interval $T_2$ can be calibrated in volts.

The preceding analysis has assumed that the output $V_0$ of amplifier 101 is at zero volts at the end of interval $T_2$ which is the beginning of following $T_1$ interval. In practice $V_0$ must be slightly negative at this time to permit the output of amplifier 102 to be sufficiently positive to set flip-flop 107. The actual magnitude of $V_0$ at this instant, hereinafter referred to as $V_e$, may be made arbitrarily small by increasing the gain of amplifier 102. It is however a significant advantage of this invention that the accuracy of measurement is unaffected by the magnitude of $V_e$, provided only that it is identical at the beginning of time interval $T_1$ and the end of time interval $T_2$. This is apparent from Equations 3 and 6 which express the *change* in $V_0$ as $\Delta V_0$, without the necessity of defining $V_e$. Therefore, if the changes in $V_0$ are identical in magnitude during intervals $T_1$ and $T_2$ implying that $V_e$ is constant, Equation 9 is correct and is independent of the magnitude of $V_e$.

This important result causes the measurement accuracy to be independent of the gain and zero drift characteristics of amplifier 102 and also independent of trigger level variations of flip-flop 107, provided only that the variation in these quantities is negligible over the time interval $T_1+T_2$. Since such variations are usually the result of temperature or slow drift, the variations in the interval $T_1+T_2$ may be ignored.

A significant feature of the system illustrated in FIGURE 1 is that it is not necessary to reset the integrating amplifier 101 since the integration process is continuous. Accordingly, errors inherent in a reset process are eliminated. The system of FIGURE 1 has an important limitation, however, in that it is capable of measuring unknown voltages $V_x$ of one polarity only. This could be overcome by using a zero offset source but the stability of such an offset source would adversely effect the zero stability of the resulting system.

This and other limitations of the system illustrated in FIGURE 1 are overcome by the systems or apparatus illustrated in FIGURES 2, 3, 6, 7, 8 and 9. Before considering a detailed description of these figures, it should be pointed out that a logic ONE as used in describing this invention is defined as a positive level voltage or potential and a logic ZERO is defined as a negative or zero-voltage or potential. Further, the interconnections between points or terminals on the different drawings are indicated by a simple code consisting of a letter, a number located to the left of the letter and a number located to the right of the letter. This number-letter-number code is placed adjacent a terminal and indicates the point or terminal on another drawing to which the terminal is connected. An arrow located adjacent to the terminal indicates whether the information flow is into or out of the particular terminal.

Figure 2:
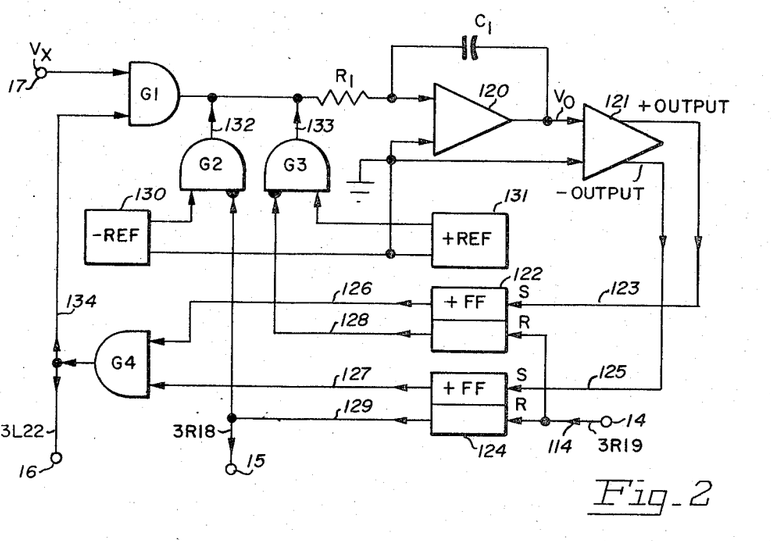
FIGURES 2 and 3 illustrate a logic diagram of one preferred embodiment of the present invention.

For example, terminal 14 illustrated in FIGURE 2 has information flowing into it as indicated by the arrow 114 located near the terminal 14. Also located near the terminal 14 is the number-letter-number code 3R19. The number 3 to the left of the letter R signifies or denotes the figure number, namely FIGURE 3, to which terminal 14 is coupled. The number 19 to the right of the letter R signifies or denotes the terminal on FIGURE 3, namely terminal 19, to which the terminal 14 of FIGURE 2 is connected. The letter R signifies or denotes that terminal 19 is located on the right side of FIGURE 3.

Figure 3:
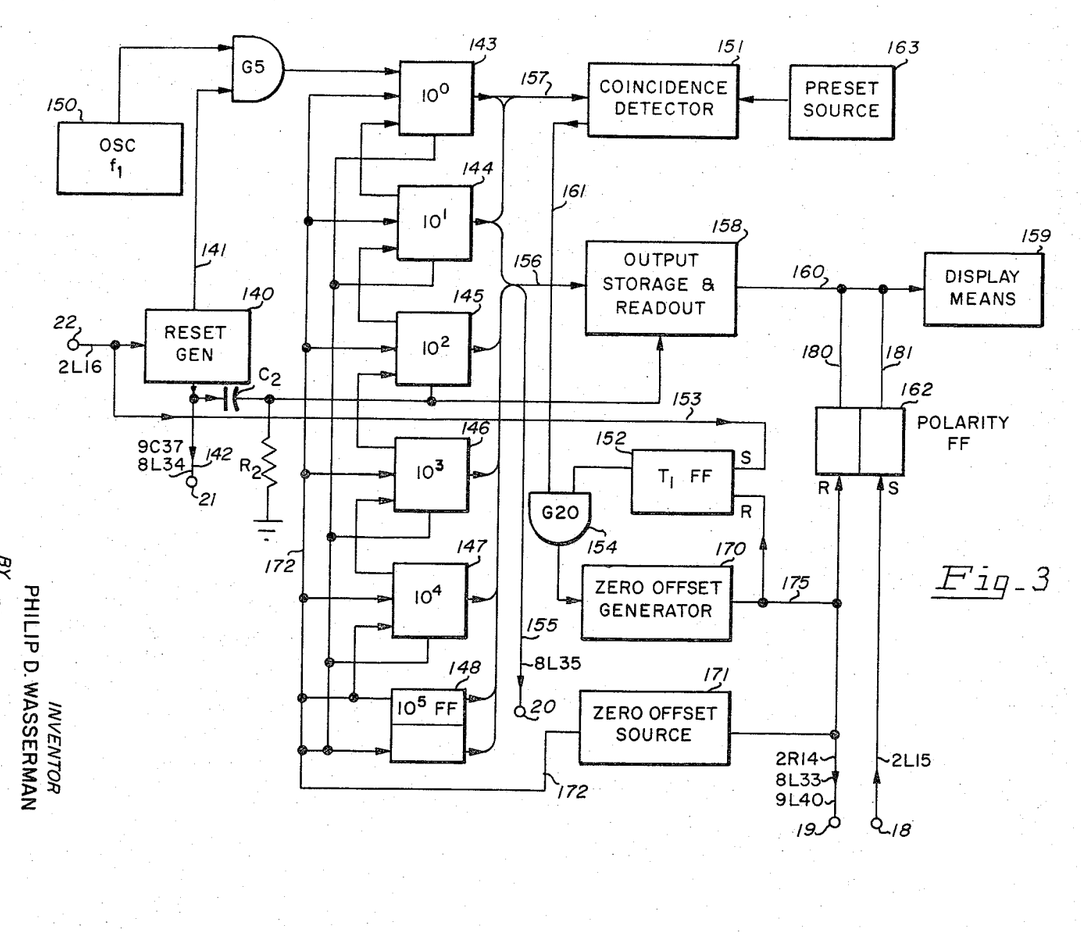

Reference to FIGURE 3 shows that the terminal 19 is located on the right side of the figure and that information does flow out of terminal 19 so that if it were coupled to terminal 14 of FIGURE 2 the information appearing on terminal 19 of FIGURE 3 would flow into the terminal 14 of FIGURE 2. Three letters, namely R, L and C are used in this code with R denoting the right side of the indicated figure, L the left side and C the center. Reference to terminal 19 of FIGURE 3 shows that three number-letter codes are associated with this terminal, namely 2R14; 8L33 and 9L40. These codes denote that the terminal 19 of FIGURE 3 is connected or coupled to the terminal 14 located on the right side of FIGURE 2 (2R14); the terminal 33 located on the left side of FIGURE 8 (8L33) and the terminal 40 located on the left side of FIGURE 9 (40L9). The interconnections between the various terminals on the several drawings can readily be determined in a like manner it being understood that the number to the left of the letter signifies the figure number, the number to the right of the letter signifies a terminal on the indicated figure number and the letter (R, L or C) gives the general location of the indicated terminal on the indicated figure or drawing.

Referring now to FIGURES 2 and 3, there is illustrated in FIGURE 2 an integrating amplifier 120, including a resistor $R_1$ and a capacitor $C_1$, having its input coupled, by way of an analog gate $G_1$, to an unknown input voltage $V_x$ which appears on the terminal 17. The voltage output $V_0$ of the integrating amplifier is coupled to an amplifier 121 which has two 180 degrees out of phase outputs labelled $+$ output and $-$ output, respectively. However, the amplifier 121 is so biased that both of these outputs are positive when the output $V_0$ of the integrating amplifier 120 is zero. The $\pm$output of the amplifier 121 is coupled to the set S input of a flip-flop 122 by way of the lead 123 and the $-$ output is coupled to the set input of another flip-flop 124 by way of the lead 125. The set outputs of the flip-flops 122 and 124 are coupled to a digital AND gate $G_4$ by way of the leads 126 and 127 respectively. The reset output of the flip-flop 122 is coupled to the enabling terminal of an analog gate $G_3$ by way of a lead 128 and the reset output of flip-flop 124 is coupled to the enabling input of an analog gate $G_2$ by way of a lead 129. A negative reference potential 130 is applied to the input of the analog gate $G_2$ and a positive reference potential 131 is applied to the input of the analog gate $G_3$. The output of each of the analog gates $G_2$ and $G_3$ is coupled to the input of the integrating amplifier by way of the leads 132 and 133 respectively.

The output of the digital AND gate $G_4$ is coupled to the enabling input terminal of the analog gate $G_1$ by way of the lead 134 and to the terminal 16 which is coupled to the terminal 22 located in the left side of FIGURE 3.

Reference to FIGURE 3 shows that the output of the digital AND gate $G_4$ of FIGURE 2 is coupled to a reset generator 140 by way of the terminal 22 of FIGURE 3. The reset generator 140 functions to produce a pulse on the leads 141 and 142 whenever the output of the digital gate $G_4$ of FIGURE 2 is a positive going potential as will be described below in detail. The output of the reset generator on the lead 141 is used to disable a digital AND gate $G_5$ thereby preventing the application of the oscillator 150 output to a counter which includes five scale of ten counters 143, 144, 145, 146 and 147 and a scale of two counter 148 which may comprise an ordinary bistable flip-flop.

The oscillator 150 may include a square wave generator the output of which is differentiated in a well known manner to produce a negative and positive voltage spike for each cycle of square wave output. By the use of a diode, in a well known manner, either the negative or positive voltage spike may be eliminated to produce a single voltage spike for each square wave cycle produced by the oscillator 150. These voltage spikes are applied to the counter by way of the digital AND gate $G_5$ and cause the counter to count up. The scale of ten counting units 143, 144, 145, 146 and 147 may each comprise a plurality of flip-flops interconnected in a well known manner so as to yield ten stable states. Each of the scale of ten counting units 143, 144, 145, 146 and 147 are interconnected to one another and the flip-flop 148 in a well known manner to produce a decimal counter having 6 decimal positions. Since the flip-flop 148 is the most significant digit position of the counter when it is full and since it can only contain the digits 1 or 0 because it is a bistable device, the largest number to which the counter can count is 199,999. As will be obvious to those skilled in the art, the counter can contain more or less units to enable smaller or larger maximum counts to be made. Also, other appropriate counters may be used such as ring counters, counting tubes, etc., without departing from the spirit and scope of this invention.

The counter, which includes the units 143, 144, 145, 146, 147 and 148 is utilized to produce an accurate $T_1$ time period and to measure the duration of the time period $T_2$ as will be described hereinbelow in detail. The output of the reset generator appearing on the lead 142 is applied to the terminal 21 and, by way of the differentiating network of capacitor $C_2$ and resistor $R_2$, to the counter to set a predetermined number therein. The number contained in the counter is applied to the terminal 20 by way of the cable 155 and to an output storage and read-out device 158 by way of the cable 156. The storage and read-out unit has an output coupled to a display means 159 by way of the cable 160. The display means 159 includes any suitable means for indicating the magnitude of the unknown input voltage and may include a mechanical or electrostatic printer or a plurality of vacuum tubes, such as Nixie tubes, which may be utilized to visually display a decimal number. The outputs of a flip-flop 162 are also coupled to the display means 159, which outputs indicate to the display means the polarity of the unknown input voltage $V_x$ in a manner described below. The number contained within the counter is also applied to a coincidence detector 151 by way of the cable 157 which coincidence detector produces an output voltage on the lead 161 whenever the number in the counter matches (is equal to) a number contained in a preset source 163. Such an output on the lead 161 activates a zero offset generator 170 whenever the AND gate $G_{20}$ is enabled which in turn causes a potential to appear on the terminal 19 and also causes a zero offset source 171 to set a predetermined number into the counter.

Figure 4:
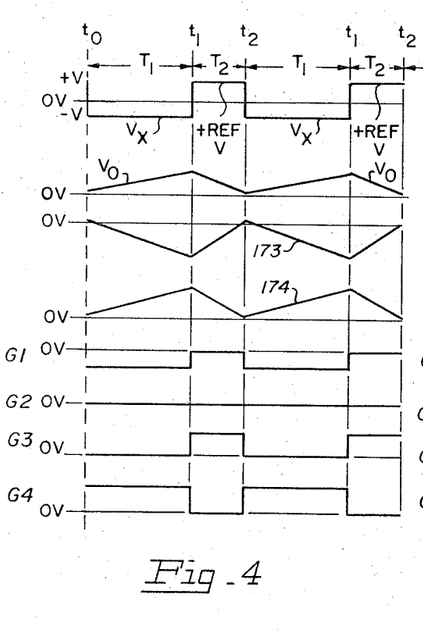
FIGURES 4 and 5 illustrate various idealized waveshapes occurring in the system of FIGURE 2.

The operation of the apparatus illustrated in FIGURES 2 and 3 will be readily understood in conjunction with a specific example. Assume that the unknown voltage $V_x$ appearing on the terminal 17 of FIGURE 2 is a negative DC level. Various idealized waveforms throughout the apparatus illustrated in FIGURES 2 and 3 for a negative unknown input voltage $V_x$ are illustrated in FIGURE 4. Referring now to FIGURES 2, 3 and 4, at time $t_0$, which corresponds to the beginning of the precise time interval $T_1$, the + and − outputs of the amplifier 121 of FIGURE 2 are both positive thereby causing the flip-flops 122 and 124 to be in a set condition. This causes the set outputs of these flip-flops to be at a logic ONE or positive potential which activates the AND gate $G_4$ causing a positive potential to appear on the lead 134 which in turn will activate the analog gate $G_1$. When the analog gate $G_1$ is activated, the unknown input voltage $V_x$ is applied to the input of the integrating amplifier 120. Also at time $t_0$, a predetermined number is set into the counter illustrated in FIGURE 3.

Subsequent to time $t_0$, the negative $V_x$ voltage applied to the input of the integrating amplifier 120 causes the output $V_0$ of this amplifier to increase in a positive direction as illustrated in FIGURE 4. This causes the + output of the amplifier 121 to increase negatively and the − output to increase positively as illustrated by the waveshapes 173 and 174 of FIGURE 4 respectively. Since the − output of the amplifier 121 increases positively, the flip-flop 124 is held in a set condition by the increasing positive potential appearing on the lead 125. Since the + output of the amplifier 121 is increasing in a negative direction the potential on the lead 123 soon becomes negative which enables the flip-flop 122 to be placed into its reset condition. However, the flip-flop 122 will not be reset until a positive or logic ONE readout pulse appears on the terminal 14.

During this time interval, the analog gates $G_2$ and $G_3$ are disabled because their enabling terminals are coupled to the reset outputs of the flip-flops 124 and 122, respectively, which flip-flops are in the set condition. Also, during this time interval, the pulses produced by the oscillator 150 (FIGURE 3) are applied to the counter by way of the AND gate $G_5$ which causes the counter to count up. At time $t_1$, which corresponds to the end of the time interval $T_1$, the counter is equal to the number in the preset source 163 (FIGURE 3) which causes an output on the lead 161 which will activate the zero offset generator 170 provided that the $T_1$ flip-flop 152 is in the set state enabling AND gate $G_{20}$. When activated, the zero offset generator produces a positive pulse or logic ONE on the lead 175 which appears on the terminal 19, resets the polarity flip-flop 162 and activates the zero offset source 171. The zero offset source, when activated by the output of the zero offset generator, will enter a predetermined number into the counter by way of the cable 172 which number is zero or a zero offset. The positive pulse output of the zero offset generator 170 resets the $T_1$ flip-flop 152, thereby disabling AND gate $G_{20}$. The $T_1$ flip-flop AND gate $G_{20}$ thereby act in conjunction to prevent any but the first output from the coincidence detector 151 from triggering the zero offset generator during time interval $T_2$. The positive pulse output of the zero offset generator 170 applied to the terminal 19 of FIGURE 3 is coupled to the terminal 14 of FIGURE 2 whereby it is applied to the reset R inputs of each of the flip-flops 122 and 124. Since the potential appearing on the set S input of the flip-flop 122 is negative due to the negative potential appearing on the + output of the amplifier 121 the positive pulse on the terminal 14 of FIGURE 2 causes the flip-flop 122 to be placed into its reset condition. Because the potential on the set S input of the flip-flop 124 is positive due to the positive potential appearing on the − output of the amplifier 121, the positive pulse on the terminal 14 will not affect the flip-flop 124 which will remain in its set condition. The fact that a positive potential on the set S inputs of the flip-flops 122 and 124 assume precedence over the positive potential applied to the reset R inputs is a result of the manner in which the flip-flops 122 and 124 are biased. As will be obvious to those skilled in the art, this same result may be readily accomplished by other means.

Resetting of the flip-flop 122 causes the potential on its set output lead 126 to change from a positive potential (logic ONE) to a substantially zero or ground potential (logic ZERO). Likewise, the potential on the reset output lead 128 changes from a logic ZERO (ground or zero potential) to a logic ONE (a positive potential). The logic ZERO appearing on the lead 126 disables the digital AND gate $G_4$ causing the potential on its output lead 134 to go to a logic ZERO which disables the analog gate $G_1$ which inturn removes the unknown input voltage $V_x$ from the input of the integrating amplifier 120. The logic ONE appearing on the lead 128 enables the analog gate $G_3$ which applies the positive reference potential 131 to the input of the integrating amplifier 120. It will be noted that this potential is opposite to the polarity of the unknown input voltage $V_x$ and was automatically selected by the circuit of FIGURE 2.

As illustrated by FIGURE 4, the time $t_1$ is the end of the precise time interval $T_1$ and the beginning of the time interval $T_2$ the length of which is proportional to the magnitude of the unknown input voltage $V_x$. Also, the time $t_1$, at which the counter is preset to zero or a zero offset, the flip-flop 122 is reset with the consequent removal of $V_x$ as the input to the integrating amplifier 120 and application of the positive reference voltage 131 to the input of the integrating amplifier, is very small causing these operations to occur substantially simultaneously.

Subsequent to time $t_1$, the output $V_0$ of the integrating amplifier decreases toward zero from a positive potential as illustrated in FIGURE 4 because a positive DC voltage 131 is now applied to the input of the integrating amplifier 120. Also, as shown by the waveshapes 173 and 174 of FIGURE 4, this causes the + output of the amplifier 121 to decrease from a negative potential toward zero and the − output of the amplifier 121 to decrease from a positive potential toward zero volts.

As explained hereinabove, the amplifier 121 is so biased that, when $V_0$, the output of the integrating amplifier 120 reaches zero, the + and − outputs of the amplifier are also positive. Accordingly, as $V_0$ approaches zero, the ± output of the amplifier 121 becomes positive as illustrated by the waveshape 173 of FIGURE 4 and the − output of the amplifier 121 becomes less positive approaching zero as illustrated by the waveshape 174. Also as described hereinabove, the time required for the output $V_0$ of the integrating amplifier 120 to approach zero is proportional to the magnitude of the unknown input voltage $V_x$. At time $t_2$, which indicates the end of the time period $T_2$, $V_0$ has approached zero and the + output of the amplifier 121 appearing on the lead 123 is sufficiently positive to change the flip-flop 122 back into its set conditon. Setting of the flip-flop 122 disables the analog gate $G_3$ thereby removing the positive reference voltage 131 as the input to the integrating amplifier due to the lead 128 now transmitting a logic ZERO. A logic ONE now appears on the lead 126 and activates the digital AND gate $G_4$ which causes a logic ONE to appear on the lead 134 to which the output of the AND gate $G_4$ is coupled. This logic ONE (a positive potential) appears on the enabling terminal of the analog gate $G_1$ thereby causing the unknown input voltage $V_x$ to again be applied as the input to the integrating amplifier 120. It is clear then that time $t_2$ not only marks the end of the time period $T_2$ but also indicates the beginning of a new precise time interval $T_1$.

The logic ONE appearing on lead 134 as the output of the AND gate $G_4$ also appears on the terminal 16 which is coupled to the terminal 22 on the left side of FIGURE 3 which is the input to the reset generator 140. This logic ONE is also applied to the set input of the $T_1$ flip-flop 152, thereby causing its set output to go positive, enabling AND gate $G_{20}$. The reset generator 140 is responsive to the output of the digital AND gate $G_4$ going from a logic ZERO to a logic ONE (a positive going potential) which occurs at time $t_2$ and is not responsive to output of the digital AND gate $G_4$ going from a logic ONE to a logic ZERO (a negatively going potential) which occurs at time $t_1$. This is accomplished by preceding the reset generator 140 with an AC gate (not shown) which includes a differentiating resistor and capacitor and a diode. As is well known in the art, at time $t_1$ when the AND gate is disabled causing its output to go from a logic ONE to a logic ZERO, the differentiating resistor and capacitor of the AC gate will produce a negative spike of voltage which is not applied to the reset generator because it is applied to the anode of the diode included in the AC gate. At time $t_2$, however, as the output of the AND gate $G_4$ goes from a logic ZERO to a logic ONE, the differentiating resistor and capacitor of the AC gate produce a positive spike of voltage which is also applied to the anode of the diode of the AC gate causing the diode to conduct thereby applying the positive spike of voltage to the reset generator. The reset generator may include a one shot oscillator or monostable multivibrator and is designed such that the application of the positive spike of voltage causes the reset generator to produce a pulse on the output leads 141 and 142 which pulse has a width slightly less than the time or period between voltage pulses produced by the oscillator 150. This pulse appearing on the lead 141 disables the digital AND gate $G_5$ thereby preventing the next pulse produced by the oscillator 150 from advancing the counter if the next pulse should occur during the time period the reset generator produces an output.

The output pulse of the reset generator appearing on the lead 142 is differentiated by the capacitor $C_2$ and resistor $R_2$ and applied, by way of the lead 149, such that the trailing edge of the output pulse produced by the reset generator causes a read-out from the storage and read-out unit 158 to the display means 159. The number contained in the storage unit at time $t_2$ is the number to which the counter counted during the time interval $T_2$ by having the output of the oscillator 150 applied thereto by way of the AND gate $G_5$. Therefore, this number is proportional to the time interval $T_2$ which is proportional to the magnitude of the unknown input voltage $V_x$. As will be obvious to those skilled in the art, this permits the frequency of the oscillator to be such that the number transferred from the storage and read-out unit 158 at time $t_2$ can be calibrated in volts. The trailing edge of the output pulse produced by the oscillator 150 is also routed to the appropriate set and reset inputs of each unit 143–148 of the counter to reset the counter to zero.

These operations take place at the trailing edge of the output pulse produced by the reset generator 140 so that the time interval between the leading and trailing edge of the output pulse allows all transient conditions in the counter to die out before a read-out occurs. It is clear then that at time $t_2$ the display unit provides a visible indication of the magnitude of the unknown input voltage $V_x$, that is, the value of the unknown input voltage $V_x$ has been measured. The set S input of the polarity flip-flop 162 is coupled to the reset output of the flip-flop 124 (FIGURE 2) which remained set throughout the time intervals $T_1$ and $T_2$. Accordingly, the polarity flip-flop 162 remains in its reset condition which produces an output on the reset output lead 180 which indicates to the display means 159 that the unknown voltage $V_x$ was negative. Once the output pulse of the reset generator has terminated, the AND gate $G_5$ is enabled and the next pulse from the oscillator 150 steps the counter thereby initiating a new time interval $T_1$ and causing the cycle of $T_1$ and $T_2$ time periods to be repeated indefinitely.

Figure 5:
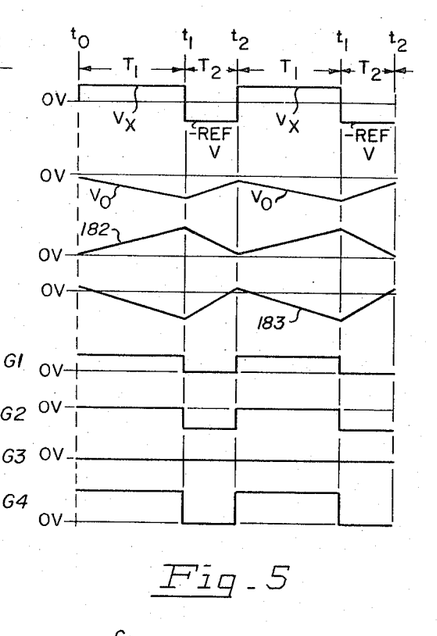

FIGURE 5 illustrates various idealized waveshapes throughout the apparatus of FIGURES 2 and 3 when the unknown input voltage $V_x$ is positive. Referring now to FIGURES 2, 3 and 5 it is shown that at the beginning of the precise time interval $T_1$ the output $V_0$ of the integrating amplifier is slightly negative and the + and — outputs, represented by the waveforms 182 and 183 respectively, of the amplifier 121 are both positive. Subsequent to time $t_0$, the positive input voltage $V_x$ causes $V_0$ to increase negatively the + output 182 of amplifier 121 increases positively and the — output 183 increases negatively. In a short time the negative going output 183, which appears on the lead 125 of FIGURE 2, enables the flip-flop 124 to be reset. This will not occur, however, until time $t_1$ when the count in the counter of FIGURE 3, due to the output of the oscillator 150 being applied thereto, equals the number in the preset source 163. When this occurs, a preselected number is set into the counter by the zero offset source 171 as described above. Also, a pulse, the output of the zero offset generator, resets the polarity flip-flop 162 if it is not already reset and is applied to the terminal 19 of FIGURE 2. The pulse on the terminal 19 will reset the flip-flop 124 since its set S input is negative and will not affect the flip-flop 122 since its set S input is positive. Resetting of the flip-flop 124 disables the AND gate $G_4$ which in turn disables the analog gate $G_1$. Also, resetting of the flip-flop 124 enables the analog gate $G_2$ which applies the negative reference potential 130 to the input of the integrating amplifier 120. Further, resetting of the flip-flop 124 produces a potential on the terminal 15 which is applied to the terminal 18 of FIGURE 3 to set the polarity flip-flop 162. When in a set condition, the output appearing on the lead 181 of the polarity flip-flop 162 informs the display means that the unknown input voltage $V_x$ has a positive polarity. As is now obvious, these operations initiate the time interval $T_2$ which is proportional to the value of the unknown input voltage $V_x$.

At time $t_2$, the time of occurrence of which is dependent upon the magnitude of the unknown input voltage $V_x$, the output $V_0$ of the integrating amplifier is approaching zero from a negative potential, the + output of the amplifier 121 appearing on the lead 123 is approaching zero from a positive potential which keeps the flip-flop 122 set, while the output of the amplifier appearing on the lead 125 goes slightly positive from a negative potential (crosses zero potential) thereby setting the flip-flop 124. When in a set condition, a logic ZERO appears on the lead 129 emanating from the reset side of flip-flop 124 which disables the analog gate $G_2$ which removes the negative reference voltage 130 from the input of the integrating amplifier 120. Also, when in a set condition, a logic ONE appears on the lead 127 emanating from the set side of flip-flop 124 which enables the AND gate $G_4$ producing a logic ONE on the lead 134 which enables the analog gate $G_1$ to again apply the unknown input voltage $V_x$ to the input of the integrating amplifier 120. Also, the logic ONE on the lead 134 appears on the terminal 16 and is applied to the input of the reset generator 140 of FIGURE 3.

The output of the AND gate $G_4$ going from a logic ZERO to a logic ONE will, as described above, activate the reset generator 140 (FIGURE 3) and produce a pulse on the lead 141 which temporarily disables the AND gate $G_5$. The magnitude of the count which now appears in the counter, and also in the storage and read-out unit 158, is proportional to the magnitude of the unknown positive input voltage $V_x$. The trailing edge of the output pulse of the reset generator appearing on the lead 142 will, as described above, set the counter to zero and cause a read-out from the storage and read-out unit to the display means 159. The flip-flop 162 being in the set condition produces an output on the lead 181 which indicates to the display means that $V_x$ is positive.

The output of the AND gate $G_4$ enabling the analog gate $G_1$ and the counter being reset to zero begins another precise time interval $T_1$ which is followed by another measuring time period $T_2$ with the cycle of $T_1$ and $T_2$ time periods being repeated indefinitely.

Figure 10:
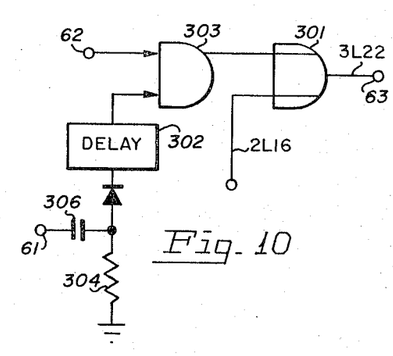
FIGURE 10 illustrates a logic diagram incorporating a delay means to protect against system "lock up."

If ever the condition should occure that the $T_1$ flip-flop is in the reset state during the time interval $T_1$ that is, when flip-flops 122 and 124 are both set, coincidence pulses on line 161 cannot pass through gate $G_{20}$, hence no zero offset pulses will occur, no reset pulses will be applied to flip-flops 122 and 124 via line 114, and the system will be "locked up." Although this should never occur, it may happen occasionally and the circuit illustrated in FIGURE 10 will correct this condition if it does occur.

Referring now to FIGURE 10, an OR gate 301 has been inserted between terminal 16 of FIGURE 2 and terminal 22 of FIGURE 3. This OR gate in no way alters the operation of this connection but allows a pulse to be "summed in" as shown in FIGURE 10. The input to a delay 302 shown in FIGURE 10 is the set output of the $T_1$ flip-flop 152 which is applied to the terminal 61. The output of the oscillator 150 is applied to one input of an AND gate 303 by way of the terminal 62. If the system is functioning correctly the $T_1$ flip-flop is changing state regularly and hence a continuous train of positive pulses is applied to the delay circuit 302 by way of the differentiating circuit comprising the resistor 304 and the capacitor 306. The circuit of FIGURE 10 has the characteristic that its output appearing on the output of the AND gate 303 is at zero volts for a time $T_0$ after an input pulse is received on the terminal 61. Thus, if $T_0$ (the delay 302) is greater than $T_1+T_2$, the output of the delay 302 will be at zero volts at all times when the system is functioning correctly. Thus, under these circumstances the AND gate 303 is disabled preventing the OR gate 303 from receiving the oscillator pulses appearing on the terminal 62. System operation in this case is identical to that described hereinabove.

Should the system "lock up" the $T_1$ flip-flop will not be changing state, the delay 302 will run out, enabling the AND gate 303 which passes an oscillator pulse to the reset generator 140 of FIGURE 3. This sets the $T_1$ flip-flop 152 and triggers the delay circuit 302 which disables the AND gate 303 preventing additional oscillator pulses from reaching the reset generator 140. Thus, the $T_1$ flip-flop is set and normal system operation is resumed.

A comparison of FIGURES 4 and 5 will indicate that for a positive input voltage $V_x$, the output $V_0$ of the integrating amplifier 120 between the time intervals $T_2$ and $T_1$ approaches zero but is slightly negative whereas when the unknown input voltage $V_x$ is negative the output $V_0$ approaches zero but is slightly positive. This indicates that when the unknown input voltage $V_x$ changes polarity during a precise time interval $T_1$, the output $V_0$ of the integrating amplifier 120 passes through a "dead zone" during which the flip-flops 122 and 124 are held in a set state by a positive potential appearing on the leads 123 and 125, respectively, even in the presence of a positive pulse on the terminal 14. This positive potential appearing on the leads 123 and 125 is due to the fact that the + and − outputs of the amplifier 121 are both positive when $V_0$ is zero or close to zero. This "dead zone" can be reduced to a minimum, however, by utilizing a high gain amplifier 121 to amplify the slope of the output $V_0$.

Also, when the unknown input voltage $V_x$ has a very small magnitude, it is possible that the output $V_0$ of the integrating amplifier will be so close to zero as to prevent the resetting of one of the flip-flops 122 or 124 by a pulse appearing on the terminal 14. This possibility is also reduced to a minimum by using a high gain amplifier. Further, as shown by equation nine above, the measuring time interval $T_2$ is proportional to the precise time interval $T_1$, therefore, the time interval $T_1$ may be digitally selected by changing the number in the present source 163, and the scale factor of the device may be changed as desired. Thus, for very small magnitudes of unknown input voltage $V_x$, the time interval $T_1$ may be increased thereby giving the output $V_0$ of the integrating amplifier ample time to move out of the "dead zone."

As described above, the length of the time interval $T_1$ is dependent on the number in the preset source such that $$T_1 = \frac{N_p}{F} \quad (10)$$

Where $N_p$ equals the number in the present source and F equals the frequency of the oscillator 150. If the counter is set to zero by the reset generator at time $t_0 \Delta t_2$. Since the number $N_r$ transferred to the display means 159 at the end of the measuring period is partially controlled by a zero offset $N_0$ when such an offset is used, then $$N_r = T_2 F + N_0 \quad (11)$$

or $$T_2 = \frac{N_r - N_0}{F} \quad (12)$$

Substituting Equations 10 and 12 into Equation 9 yields:

$$\frac{N_r - N_0}{F} = \frac{V_x N_p}{V_{ref} F} \quad (13)$$

Therefore:

$$N_r = \frac{V_x N_p}{V_{ref}} + N_0 \quad (14)$$

which shows that the output number transferred to the display means 159 is independent of the oscillator 150 frequency F and long term stability of this oscillator is, accordingly, unimportant to the system illustrated in FIGURES 2 and 3. Also, the number $N_p$ in the preset source 163 is a coefficient of the unknown input voltage $V_x$ and may be used to adjust the scale factor as described above. Further, $N_0$ is a constant term added to a variable and, therefore, constitutes a zero offset. Also, Equation 14 shows that the output number $N_r$ is proportional to the ratio of the unknown input $V_x$ to the reference voltages $V_{ref}$ or, if these voltages are not constant, to the ratio of the time integrals of these voltages. Since the described system compares time integrals, zero average noise on either $V_x$ or $V_{ref}$ will have no effect on the system accuracy. As a practical matter, the precise time interval $T_1$ should be selected to be an even multiple of the period of the 60 cycle input to the power supply (not shown), thereby providing virtually infinite rejection to this troublesome frequency. Further, as will be apparent to those skilled in the art, the reference voltage $V_{ref}$ may be used as another input to the system for the purpose of obtaining a digital output inversely proportional to $V_{ref}$ or, more commonly, the reference voltage $V_{ref}$ may be used to obtain a "ratiometer" mode of operation which is widely used in analog computations where a reference potential is applied to the measuring system.

As described above, the end of the measuring time period $T_2$ is determined by the output $V_0$ of the integrating amplifier 120 of FIGURE 2 approaching zero or the edge of the "dead zone" which causes both of the flip-flops 122 and 124 to be set because a positive potential will appear on the leads 123 and 125 for this condition. Both of these flip-flops being set activates the AND gate $G_4$ which enables the analog gate $G_1$ to apply the unknown input voltage $V_x$ to the input of the integrating amplifier to initiate another time interval $T_1$. However, activation of the AND gate $G_4$ by $V_0$ approaching zero is not synchronized with the output of the oscillator 150. Accordingly, the time interval between the activation of the AND gate $G_4$ and the next output pulse from the oscillator will be from zero seconds to the full time period between pulses produced by the oscillator 150. Further, activation of the AND gate $G_4$ enables the reset generator 140. When enabled, the reset generator produces a pulse on the lead 141 to disable the AND gate $G_5$ for a time period less than the time interval between pulses supplied by the oscillator 150. The trailing edge of a similar pulse appearing on the output lead 142 of the reset generator will cause a read-out to the display means 149 and the setting of the counter to zero. This time uncertainly between the application of the unknown input voltage $V_x$ to the input of the integrating amplifier 120 and the first pulse from the oscillator 150 which steps the counter during the time period $T_1$, causes a variation in the duration of the time interval $T_1$ which produces a corresponding random variation in the scale factor.

This time variataion can be eliminated by applying the unknown input $V_x$ to the integrating amplifier 120 and beginning the time interval $T_1$ when the first output pulse from the oscillator is applied to the counter after the counter has been set to zero by the output of the reset generator 140. This can be accomplished by the apparatus illustrated in FIGURE 6 which is substantially identical to the apparatus of FIGURE 2 except that the analog gate $G_1$ is now enabled by an input flip-flop 193 rather than the output of the AND gate $G_4$. The operation of this system is such that when a measuring time interval $T_2$ is initiated by the appearance of a pulse on the terminal 14, the input flip-flop 193 is reset by the pulse appearing on the terminal 14 being applied to the reset R input of the flip-flop 193 by way of the lead 198. The end of the time interval $T_2$ causes the AND gate $G_4$ to be activated as described above. The output of the AND gate $G_4$ causes a read-out of the display means and the setting of the counter to zero. During this time interval, the measuring time interval $T_2$ has ended but the time interval $T_1$ has not yet been initiated. The precise time interval $T_1$ will begin when, after a read-out to the display means has taken place and the preselected number has been set into the counter, the next pulse produced by the oscillator is applied to the counter causing it to step, i.e., count. When this pulse from the oscillator 150 occurs, a pulse appears on the terminal 24 of FIGURE 6 which sets the input flip-flop 193 thereby causing a potential on the set output lead 194 which enables the analog gate $G_1$ to apply the unknown input $V_x$ to the input of the integrating amplifier.

Figure 6:
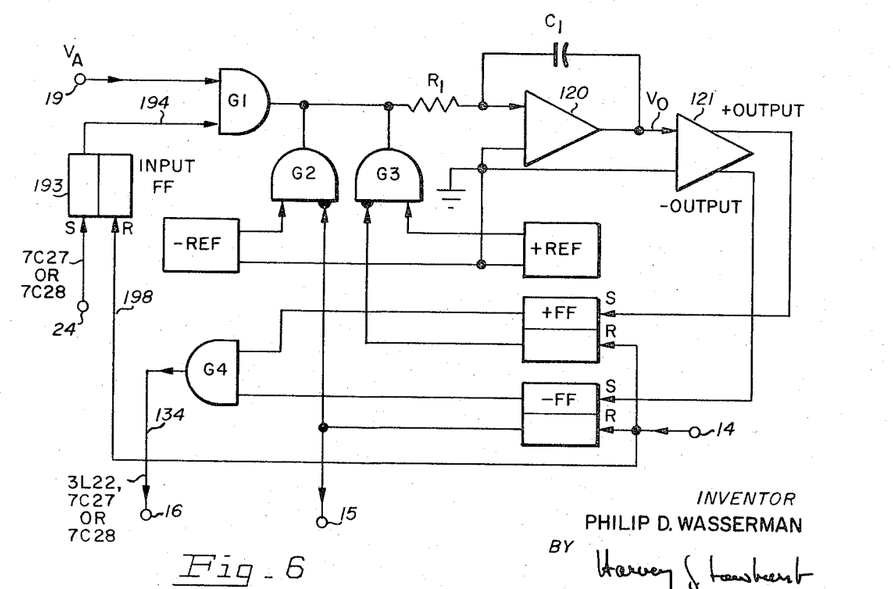
Figure 7A:
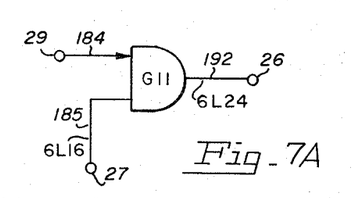
FIGURES 7A and 7B illustrate different means for obtaining a signal to activate an element of FIGURE 6.
Figure 7B:
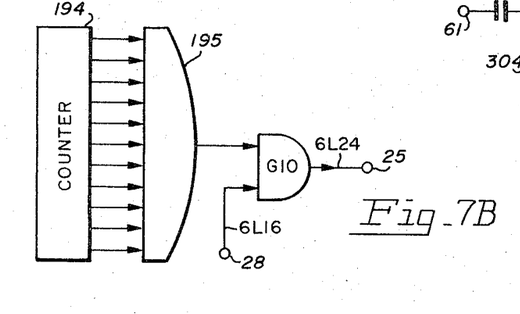

The problem remains of generating the pulse applied to the terminal 24 of FIGURE 6. This can be accomplished by several means two of which are illustrated in FIGURES 7A and 7B. Referring now to FIGURE 7A there is illustrated a digital AND gate $G_{11}$ having one input lead 184 coupled to the terminal 29 and another input lead 185 coupled to the terminal 27. The output of the AND gate $G_{11}$ is applied, by way of the lead 192, to the terminal 26 which in turn is coupled to the terminal 24 located on the left side of FIGURE 6 and is the input to the set side of the input flip-flop 193. The terminal 29 is coupled to the output of the AND gate $G_5$ (FIGURE 3) and the terminal 27 is coupled to the output of the AND gate $G_4$ (FIGURE 6). When a time interval $T_2$ is terminated, the output of the AND gate $G_4$ is a logic ONE and activates the input lead 185 of the output of the reset generator 140 (FIGURE 3), causes a read-out to the display means and sets a preselected number (zero) into the counter, the next pulse produced by the oscillator 150 is passed by the AND gate $G_5$ to step the counter. This next oscillator pulse also appears on the other input lead 184 of the AND gate $G_{11}$ thereby enabling the AND gate $G_{11}$ to produce a pulse on the output lead 192 that sets the input flip-flop 193 into its set S state which applies the unknown voltage $V_x$ as the input to the integrating amplifier 120. The output pulse on the gate $G_{11}$ lead 192 has a duration equal to the duration of the oscillator pulse appearing on the gate $G_{11}$ input lead 184. Accordingly, the first output pulse from the oscillator, after the termination of the reset generator output, has applied the unknown input $V_x$ to the integrating amplifier at the same time that the time period $T_1$ is initiated. Since the output of the gate $G_4$ is at a logic ONE level throughout the precise time interval $T_1$, all of the oscillator pulses passed by the AND gate $G_5$ during this time interval will activate the AND gate $G_{11}$ to produce an output on the lead 192. However, since the input flip-flop 193 is already in a set condition, these output pulses will have no effect on the state or condition of the input flip-flop. When the time period $T_1$ is terminated, the output of the AND gate $G_4$ becomes a logic ZERO to disable the AND gate $G_{11}$ and prevent any of the oscillator pulses from being applied to the set input of the input flip-flop during the measuring time interval.

Another means for providing an input to the set side of the input flip-flop 193 is illustrated in FIGURE 7B as comprising a multiple input AND gate 195, another AND gate $G_{10}$ and a counter 194. The counter 194 represents the counter of FIGURE 3 which includes the interconnected elements 143–148. When the elements 143–148 of the counter (FIGURE 3) are a plurality of bistable devices, every number which can be contained within the counter can be identified a logic ONE appearing in the set or reset side of particular ones of the bistable devices such that a series of logic ONE's in particular bistable devices, exist for one number only and no other number. By coupling the logic ONE's, that exist in the counter only when the pulse from the oscillator corresponding to the beginning of the time interval $T_1$ steps the counter, to the AND gate 195 an output from the AND gate 195 is applied to one input of the AND gate $G_{10}$ which output corresponds to the beginning of the time period $T_1$. By applying the output of the AND gate $G_4$ to the other input of the AND gate $G_{10}$ by way of the terminal 28 and since the output of the gate $G_4$ becomes a logic ONE prior to the initiation of the time interval $T_1$ as described above, the output from the AND gate 195 produces an output from the AND gate $G_{10}$ on the terminal 25 that is applied to the set input of the input flip-flop 193 (FIGURE 6) to apply the unknown input $V_x$ to the integrating amplifier at the beginning of a time period $T_1$.

Figure 8:
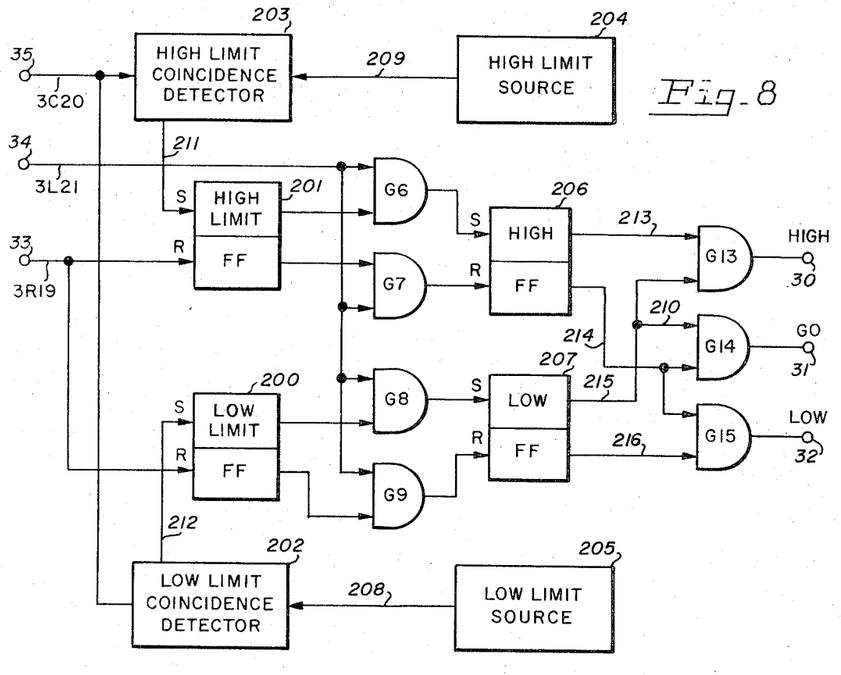
FIGURE 8 illustrates a logic diagram of means which may be used with the system shown in FIGURES 2 and 3 to obtain an indication when an unknown potential being measured exceeds, falls within, or falls outside a preselected range.

It is desirable that an indication be given when the unknown input voltage $V_x$ is below a minimum level, exceeds a maximum value, or is within minimum and maximum preset limits. Means for accomplishing this is illustrated in FIGURE 8 as including a low and high limit coincidence detector 202 and 203 respectively. Low and high limit sources 205 and 204, which may consist of switches or voltage inputs which represent a decimal number equal to the preset high and low limits, are coupled to an input of the low and high coincidence detectors by way of the cables 208 and 209 respectively. The number contained within the counter of FIGURE 3 is applied to the other input of the low 202 and high 203 coincidence detectors by way of the terminal 35. The output of the reset generator, the trailing edge of which corresponds to the read-out time, is applied to a plurality of digital AND gates $G_6$, $G_7$, $G_8$ and $G_9$. The output of the zero offset generator 170 of FIGURE 3 is coupled to the reset R input of a high limit flip-flop 201 and a low limit flip-flop 200 by way of the terminal 33. A high flip-flop 206 has its set S and reset R inputs coupled to the output of AND gates $G_6$ and $G_7$ respectively. A low flip-flop 207 has its set and reset inputs coupled to the output of AND gates $G_8$ and $G_9$ respectively. The set output of the flip-flop 206 is applied to an input of an AND gate $C_{13}$ and its reset output is applied to an input of AND gates $G_{15}$ and $G_{14}$ by way of the leads 214 and 216 respectively. The set output of the flip-flop 207 is coupled to an input of AND gates $G_{13}$ and $G_{14}$ by way of the leads 215 and 210, respectively, and its reset output is coupled to an input of the AND gate $G_{15}$ by way of the lead 216.

The operation of this circuit is such that at the beginning of a measuring period $T_2$, the output of the zero offset generator appearing on the terminal 33 places the high limit 201 and low limit 200 flip-flops into their reset condition. This causes a logic ONE on the reset output of the flip-flop 200 to be applied to the AND gate $G_9$ and a ONE on the reset output of the flip-flop of AND gates $G_7$ and $G_8$ resets the high flip-flop 206 and sets the low flip-flop 207 respectively. The ONE on the reset output of flip-flop 206 is applied to an input of the AND gate $G_{14}$ by way of the leads 214 and 216 and the ONE on the set output of the flip-flop 207 is applied to the other input of the AND gate $G_{14}$ by way of the leads 215 and 210. Both inputs of the AND gate $G_{14}$ being at a logic ONE produces an output on the terminal 31 which indicates that $V_x$ is between the present maximum and minimum. The output on terminal 31 may be used to activate an indicator light, perform control functions and/or be recorded.

If the unknown input $V_x$ exceeds the preset maximum then sometime during the time interval $T_2$ the number appearing on the terminal 35 will equal the number in the low limit source which results in the flip-flop 200 being set. Also sometime during the time period $T_2$, the number apperaing on the terminal 35 will equal the number in the high limit source 204 thereby causing the high limit coincidence detector 203 to produce an output on the lead 211 which sets the flip-flop 201. The ONE on the set output of the flip-flop 201 is applied to one input of the AND gate $G_6$ and the ONE on the set output of the flip-flop 200 is applied to one input of the AND gate $G_8$. At the end of the time period $T_2$, the output of the reset generator causes a ONE to appear on the outputs of AND gates $G_6$ and $G_8$ because these gates have a ONE applied to an input from the flip-flops 201 and 200 respectively. The ONE output from the AND gate $G_6$ sets the flip-flop 206 and the ONE from the AND gate $G_8$ sets the flip-flop 207. The resulting ONE from the set output of flip-flop 207 is applied to an input of the AND gate $C_{13}$ by way of the lead 215 and the ONE from the set output of flip-flop 206 is applied to the other input lead of the AND gate $G_{13}$ by way of the lead 213. Both inputs of 201 to be applied to an input of the AND gate $G_7$. If the unknown input $V_x$ is less than the preset minimum, then the low limit coincidence detector 202 will not produce an output on the lead 212 during the time interval $T_2$. Therefore, when the output of the reset generator, which occurs at the end of the time period $T_2$, appears on the terminal 34 the AND gates $G_7$ and $G_9$ will have a logic ONE on their output leads since these are the only AND gates supplied with a logic ONE of their other input lead by the flip-flops 200 and 201. The ONE on the output of AND gates $G_7$ and $G_9$ resets the high flip-flop 206 and the low flip-flop 207 respectively. The ONE on the reset output of the flip-flop 206 is applied to one input of the AND gate $G_{15}$ by way of the lead 214 and the ONE on the reset output of the flip-flop 207 is applied to the other input of the AND gate $G_{15}$ by way of the lead 216. Both inputs of the AND gate $G_{15}$ being at a logic ONE produce an output on the terminal 32 which indicates that $V_x$ is below the preset minimum. The output (a logic ONE) on the terminal 32 may be used to light an indicator lamp, perform control functions, or may be applied to the display means.

If $V_x$ exceeds the preset minimum but falls below the preset maximum, then sometime during the time interval $T_2$ the number appearing on the terminal 35 will equal the number in the low limit source 205 thereby causing the low limit coincidence detector to produce an output on the lead 212 which sets the flip-flop 200. When set, a ONE appears on the set output lead of the flip-flop 200 and is applied to an input of the AND gate $G_8$. At the end of the time period $T_2$, the output of the reset generator causes a ONE to appear on the outputs of the AND gates $G_7$ and $G_8$ because these gates have a ONE applied to their other input from the flip-flops 201 and 200 respectively. The ONE on the output the AND gate $G_{13}$ being at a logic ONE produces an output on the terminal 30 which indicates that $V_x$ has exceeded the preset maximum value. The output on the terminal 30 may be utilized to activate an indicator lamp, perform control functions and/or be recorded.

When the display means 159 (FIGURE 3) is a printer, such as a mechanical or electrostatic printer, an undesirable output may occur when the unknown input voltage $V_x$ changes from a positive to a negative potential and vice versa. For example, assume that the output $V_0$ of the integrating amplifier is near zero, that is, within the "dead zone." The + and − outputs of the amplifier 121 (FIGURE 2) are both positive so that flip-flops 122 and 124, respectively, are in the set state. Initiation of a measuring time interval $T_2$ by the application of a pulse on the terminal 14 may momentarily override the positive potential on the set inputs of flip-flops 122 and 124 placing these flip-flops into their reset condition for the duration of the pulse on the terminal 14. Therefore, the output of the AND gate $G_4$ goes from a logic ONE, to a ZERO and back to a ONE and will cause the number, which is approximately zero, in the counter to be transferred to the display means even though the unknown input $V_x$ is not zero but traversing the "dead zone" to reach an opposite polarity. This undesirable output may be prevented by utilizing the output on terminal 32 of FIGURE 8 to disable the display means when the number being read-out fails to exceed a predetermined minimum value. However, when the circuit of FIGURE 8 is not used or when the low limit source 205 is set too high to prevent an undesirable read-out, the circuit of FIGURE 9 may be used.

Figure 9:
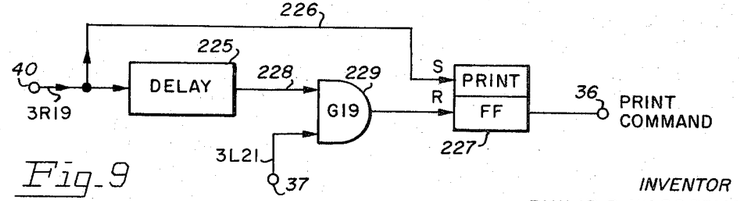
FIGURE 9 illustrates a logic diagram of means for preventing an erroneous reading when a potential being measured changes polarity.

Referring now to FIGURE 9 there is shown a flip-flop 227. The reset output of the flip-flop is coupled to the display means by way of the terminal 36 so that the display means is inactivated if the flip-flop is in a set condition and is enabled if the flip-flop is in a reset condition. At the start of a measuring interval $T_2$, the output of the zero offset generator 170 (FIGURE 3) appears on the terminal 40 and is applied by way of the lead 226 to set the flip-flop 227 thereby disabling the display means. At the same time, a delay 225 is triggered. When the delay runs out a potential will appear on the lead 228. The delay 225 is long enough to allow the output $V_0$ of the integrating amplifier to arrive at and traverse the "dead zone" with the lowest value of unknown input $V_x$ of interest. At the end of the measuring period $T_2$, the output of the reset generator 140 (FIGURE 3) appears on the terminal 37. If the time period $T_2$ was sufficiently long indicating a significant number is in the counter, the delay 229 will have run out enabling the AND gate 229 which resets the flip-flop 227 to enable the display means to receive a read-out. On the other hand, if the time interval $T_2$ is short, indicating a significant number is not in the counter, the delay 229 will not have run out when the output of the reset generator appears on the terminal 37. This prevents enabling the AND gate 229 and the flip-flop 227 will remain set which prevents the display means from receiving a read-out from the counter.

The present invention has been described by the use of logic diagrams wherein circuit functions have been assigned to blocks or rectangles. As will be obvious to those skilled in the art, the functions of the various described logic blocks can be readily realized making a detailed description of their contents unnecessary. Further, a preferred embodiment of this invention was constructed by using transistors, diodes and printed circuits, however, various other circuit elements such as vacuum tubes, integrated circuits, etc., may be used to practice this invention. Also, it should be understood that the foregoing description relates only to preferred embodiments of this invention, and that it is intended to cover all changes and modifications of the examples of the invention herein chosen for the purposes of disclosure which do not constitute departures from the spirit and scope of the invention set forth in the appended claims.

I claim:

1. In a digital voltmeter wherein an unknown potential is applied to an integrating circuit for a predetermined interval and a known potential is applied to said integrating circuit for a time interval proportional to the magnitude of the unknown potential, improved timing means comprising an oscillator for providing a plurality of sequentially occurring pulses, a counter adapted to receive the pulses produced by said oscillator, display means adapted to provide a visual representation of a number in said counter, coincidence detecting means adapted to produce a signal indicative of the lapse of a precise time interval during which the unknown potential was applied to said integrating circuit in response to a predetermined number occurring in said counter, means responsive to said coincidence detecting means signal for placing a predetermined number into said counter, first gating means responsive to the output of said integrating circuit during the time the known potential is applied thereto for producing a potential which indicates that the number in the counter is proportional to the unknown input potential, and means responsive to the potential of said gating means for transferring the number in the counter to said display means.

2. The voltmeter according to claim 1 further including second gating means operatively coupled between said coincidence detecting means and said means responsive to said coincidence detecting means for insuring that said means responsive to said coincidence detecting means signal operative to place a predetermined number into said counter only upon termination of said predetermined time interval.

3. The voltmeter according to claim 2 wherein said second gating means includes an AND gate having its output coupled to said means responsive to said coincidence detecting means signal, said AND gate having an input adapted to receive said coincidence detecting means signal and another input adapted to receive potentials indicative of said predetermined time interval and said time interval proportional to the magnitude of said unknown potential.

4. The voltmeter according to claim 2 further including a bistable device having one output coupled to said another input of said AND gate, said bistable device having one input coupled to said first gating means potential and another input coupled to said means responsive to said coincidence detecting means signal.

5. A digital voltmeter comprising an integrator circuit having an input and an output, means adapted to apply an unknown voltage to said integrator input for a predetermined time interval, means for applying a reference potential to said integrator input for a second time interval which is proportional to the magnitude of said unknown potential, counting means for determining said first and second time intervals, display means responsive to the output of said integrator for indicating the number in said counting means at the end of said second time interval which number is indicative of the unknown voltage value, and delay means responsive to the duration of said second time interval for disabling said display means whenever said second time interval ends within a predetermined time interval.

6. The voltmeter according to claim 5 wherein said delay means includes a circuit for producing an output signal having a predetermined length in response to a signal indicative of the beginning of said second time interval being applied to the input of said circuit, an AND gate having one of its inputs adapted to receive the output signal of said circuit and having another input adapted to receive a signal indicative of the end of said second time period, and a flip-flop having one of its inputs adapted to receive the output from said AND gate and its other input adapted to receive said signal indicative of the beginning of said second time interval, said flip-flop having its outputs coupled to said display means for disabling said display means whenever the length of the output signal from said circuit exceeds the second time interval.

7. In a digital voltmeter wherein an integrating circuit is adapted to receive an unknown voltage for a predetermined first time interval and a reference potential for a second time interval that is proportional to the magnitude of the unknown potential with the first and second time intervals occurring sequentially, improved circuit means comprising:
   an oscillator for producing a plurality of sequentially occurring pulses;
   a counter adapted to receive said pulses produced by said oscillator;
   display means for providing a visual display of a number in said counter;
   coincidence detecting means adapted to produce a signal indicative of the lapse of said predetermined first time interval in response to a predetermined number occurring in said counter;
   bistable circuit means responsive to said coincidence detecting means signal for applying a reference potential having a polarity opposite to said unknown voltage as the input to said integrating circuit;
   first gating means responsive to the output of said integrating amplifier for producing a signal which indicates that the number in the counter is proportional to the unknown input voltage;
   means responsive to said first gating means signal for transferring the number in said counter to said display means; and
   delay means responsive to the coincidence detecting means signal for disabling said display means whenever said first gating means signal occurs within a preselected time interval.

8. The voltmeter according to claim 7 further including second gating means responsive to the numbers in said counter during said second time interval for providing a signal whenever the unknown voltage falls below a predetermined minimum value and another signal when the unknown voltage exceeds a predetermined maximum value.

9. The voltmeter defined in claim 7 wherein said coincidence detecting means includes a numeric coincidence detector adapted to receive the numbers contained within said counter and a preselected number, and the preselected number applied to said coincidence detector may be varied to change the scale factor of said voltmeter.

References Cited

UNITED STATES PATENTS

| | | | |
|---|---|---|---|
| 3,122,729 | 2/1964 | Bothwell et al. | 324—103 |
| 3,188,455 | 6/1965 | Quick | 340—347 |
| 3,218,630 | 11/1965 | Jankovich | 340—347 |
| 3,237,190 | 2/1966 | Summers | 340—347 |
| 3,281,827 | 10/1966 | Olshausen et al. | 340—347 |
| 3,287,723 | 11/1966 | Metcalf | 340—347 |

RUDOLPH V. ROLINEC, *Primary Examiner.*

E. F. KARLSEN, *Assistant Examiner.*